United States Patent [19]

Sheehan et al.

[11] 4,322,954
[45] Apr. 6, 1982

[54] PORTABLE COOLER FOR MEDICINE

[76] Inventors: Laurence M. Sheehan, 17421 Lori Ann La., Cerritos, Calif. 90701; John C. Sheehan, 1051 W. 185th St., Gardena, Calif. 90248

[21] Appl. No.: 272,645

[22] Filed: Jun. 11, 1981

Related U.S. Application Data

[63] Continuation of Ser. No. 41,757, May 23, 1979, abandoned.

[51] Int. Cl.³ .............................................. F25D 3/08
[52] U.S. Cl. ...................................... 62/371; 62/457; 62/463; 62/464; 62/530; 220/902; 150/2.5; 190/52
[58] Field of Search ................. 62/119, 332, 333, 371, 62/457, 530, 459, 463, 464; 34/92; 220/902; 150/2.5, 2.6, 46; 190/52; 165/185

[56] References Cited

U.S. PATENT DOCUMENTS

| | | | |
|---|---|---|---|
| 2,164,677 | 7/1939 | Banke | 62/371 X |
| 2,175,267 | 10/1939 | Killeffer | 62/332 X |
| 2,219,789 | 10/1940 | Potter | 62/332 X |
| 2,573,766 | 11/1951 | Hyman | 150/46 X |
| 2,610,472 | 9/1952 | Maxwell | 62/457 X |
| 2,652,698 | 8/1953 | Schlumbohm | 62/457 X |
| 2,677,245 | 5/1954 | Edmondson | 165/185 |
| 3,156,105 | 11/1964 | Bahner | 62/457 X |
| 3,564,727 | 2/1971 | Fraser | 34/92 |
| 3,810,367 | 5/1974 | Peterson | 62/463 |
| 3,855,816 | 12/1974 | Miller | 62/457 X |

*Primary Examiner*—Lloyd L. King
*Attorney, Agent, or Firm*—Smyth, Pavitt, Siegemund & Martella

[57] ABSTRACT

A portable cooler for use in transporting medicines or the like which must be kept at lower than room temperature includes an insulative housing containing a coolant compartment and a medicine compartment, each having its own lid, and heat sinks in the compartments thermally connected by a heat tube. Water ice, dry ice, or a chilled gel may be utilized as the coolant. The whole assembly is enclosed in a carrying case about the size and weight of a carrying case for binoculars or a camera.

7 Claims, 4 Drawing Figures

PORTABLE COOLER FOR MEDICINE

This is a continuation of application Ser. No. 041,757 filed May 23, 1979, now abandoned.

BACKGROUND OF THE INVENTION

1. Field of the Invention

The present invention is in the field of medicine and particularly relates to a portable icebox for use in transporting medicine and the like.

2. The Prior Art

In U.S. Pat. No. 3,148,515 issued Sept. 15, 1964 to Jentis et al., there is disclosed an insulin preserving travel kit for diabetics. The invention employs a bimetallic thermostatic element which controls the discharge of liquid Freon from a supply bottle into a heat-exchange coil wherein the Freon is evaporated and from which gaseous Freon is discharged into the atmosphere. The invention uses a Freon bottle of a relatively unusual design, and because such containers are not readily available, the entire supply of refrigerant must be carried with the device.

In U.S. Pat. No. 3,564,727, issued Feb. 23, 1971 to Fraser, there is disclosed a non-portable apparatus, including a vacuum chamber and vacuum pump, for freeze-drying various water-containing materials. The containers of liquid material to be freeze-dried are placed in a vacuum chamber, which is then pumped down and cooled by a refrigerator which includes a tank in which chunks of dry ice are immersed in a fluid such as acetone to produce a cold-temperature bath. The cold bath is connected by a heat pipe to the vacuum chamber where the heat tube terminates in condensing fins.

These two patents serve to demonstrate that although the need for a portable medicine cooler has been recognized for years, and although the technology and components have been available for some time, a satisfactory portable cooler has not been commercially available, so far as is known.

Diabetics and other persons under medical treatment may be required to take injections to forestall unconsciousness or other ill effects. In many cases the medication must be stored at a reduced temperature such as 40° F., and it is not uncommon for the patient to store the medication in his refrigerator at home. The ability of such persons to travel freely is greatly restricted because they cannot predict when their need for the medication will arise. Storage of the medication in a centrally-located hotel refrigerator is impractical because the medication is not immediately available when needed.

It is an object of the present invention to provide a portable icebox for use by patients who must carry cooled medication with them. It is contemplated that the portable icebox of the present invention would be no larger than a camera or binocular case. Thus, the patient can easily carry the portable icebox of the present invention with him on outings such as hiking or motorcycle trips.

SUMMARY OF THE INVENTION

In accordance with the present invention, there is provided an insulative case or housing which surrounds or defines two compartments: an ice compartment, and a medicine compartment. Each of the compartments has its own lid. A heat sink is provided in each compartment and the heat sinks are thermally connected by a heat tube. The heat tube, as is known in the art, provides a one-way path for heat transfer from the medicine compartment to the ice compartment and simultaneously acts as a thermostat to limit the temperature of the medicine compartment.

It is contemplated that ice cubes or crushed ice, now readily available, will be placed in the ice compartment in a preferred embodiment. In an alternative embodiment, a plastic bag containing a chilled gel may be placed in the ice compartment to provide the desired cooling.

In a preferred embodiment, the assembly comprising the medicine compartment, the ice compartment, and the heat tube is enclosed in a carrying case, not unlike the type of carrying case used for cameras and binoculars, and provided with a strap or a handle for ease of carrying. Because the device consists largely of insulative foam material and includes relatively little metal, the present invention achieves its purpose with a minimum of weight, which further enhances its portability.

The particular utility of the present invention in connection with the travel needs of diabetic patients does not limit the application of the invention. It is recognized that the portable icebox of the present invention can be used to transport medicines other than insulin, biological specimens including semen for use in artificial insemination, and photographic film of certain types such as that used in infrared photography.

The structure and operation of the present invention, together with further objects and advantages of it, will be explained more fully below in connection with the accompanying drawings, in which several embodiments are shown by way of illustration.

DETAILED DESCRIPTION OF THE PREFERRED EMBODIMENT

Figure 1:
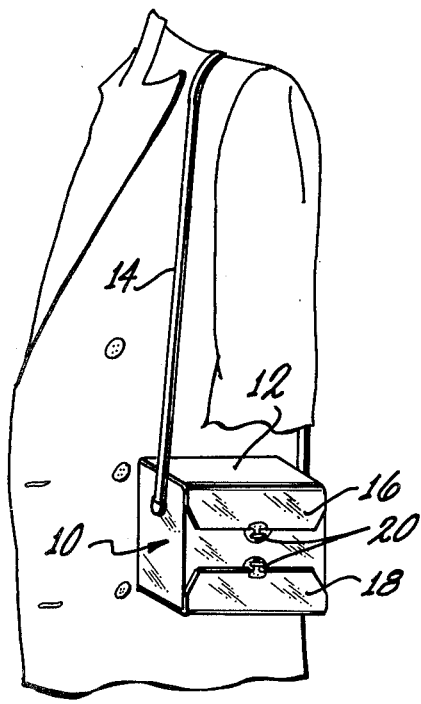
FIG. 1 is a perspective view of a preferred embodiment showing the manner in which the portable cooler of the present invention is carried.

Turning now to the drawings, in which like parts are denoted by the same reference numerals throughout, FIG. 1 shows the manner in which the portable cooler for medicine 10 may be carried. In accordance with the present invention there is provided a carrying case 12 which may be suspended by a strap 14 from a person's shoulder and thus carried about. It should be noted that the size of the portable cooler 10 is comparable to that of a pair of binoculars or a camera. In a preferred embodiment, the carrying case 12 can be selectively opened at the bottom or the top. When the case is closed, the top flap 16 and the bottom flap 18 are secured from coming open by the latches 20.

Figure 4:
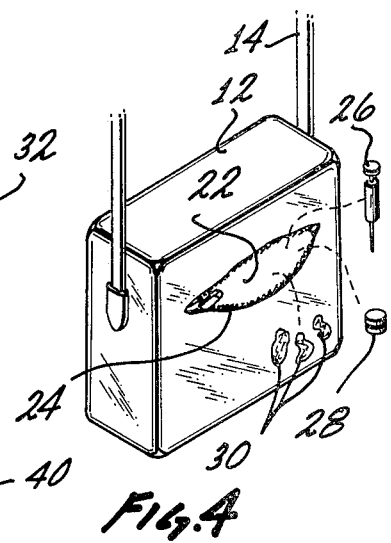

FIG. 4 shows a side of the portable cooler 10 not visible in FIG. 1. That side is provided with a pocket 22, in a preferred embodiment, and the pocket can be selectively opened and closed by the zipper 24. The pocket 22 provides a convenient storage space for associated equipment such as the syringe 26, a container of sterilizing fluid 28, and balls of cotton 30.

Figure 3:
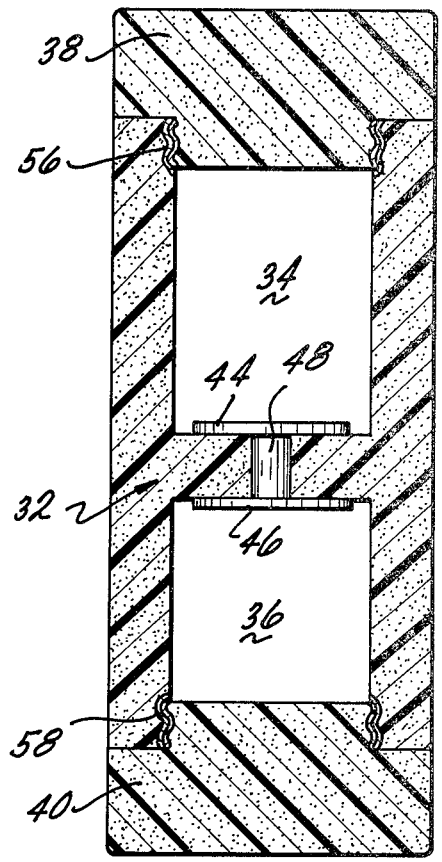
FIG. 3 is a cross-sectional elevation view of an alternative embodiment of the present invention; and, FIG. 4 is a perspective view showing a side of the portable cooler not visible in FIG. 1.
Figure 2:
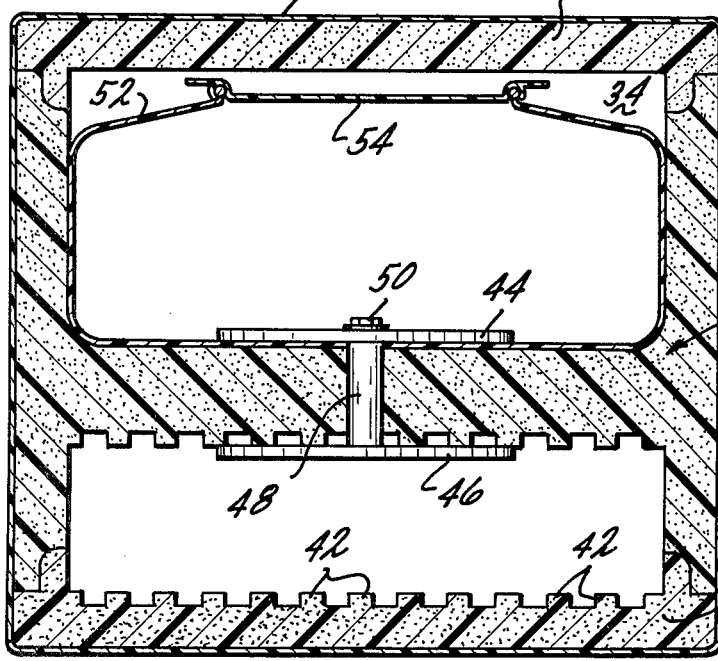
FIG. 2 is a cross-sectional elevation view of a preferred embodiment of the portable cooler of the present invention.

It is contemplated that in a preferred embodiment, the carrying case 12 would include an outer covering of plastic or simulated leather into which an assembly such as that shown in FIG. 2 or in FIG. 3 would be enclosed.

As shown in FIG. 2, the portable cooler includes a body 32 which is formed of a stiff insulative foam material, such as polystyrene foam, preferably of the closed-cell type. The body 32 is formed to include an ice compartment 34 and a separate medicine compartment 36. The body 32 includes the lid 38 of the ice compartment and the lid 40 of the medicine compartment. In a preferred embodiment, the walls of the medicine compartment 36 include ridges 42 to support the medicine container with minimal contact. A first metallic heat sink 44 is located in the ice compartment and a second metallic heat sink 46 is located in the medicine compartment 36. The heat sinks, 44, 46 are mechanically and thermally interconnected by the heat tube 48 which, in a preferred embodiment, may be attached to the heat sinks by a fastener 50.

A heat tube is a device known in the art and consisting of a sealed container, normally metallic, containing a substance having a well-defined boiling point which may be determined by the pressure within the heat tube. When the lower end of the heat tube is colder than the boiling point of the enclosed substance, the substance collects at the lower end of the heat tube in liquid form. If the temperature of the lower end of the heat tube thereafter increases to the boiling point of the enclosed substance, the substance begins to boil, and heat is absorbed as some of the substance is converted into a gaseous phase. The gaseous phase carries this heat to the upper end of the heat tube where the heat is released as the gaseous phase condenses back into the liquid phase and trickles down the walls of the heat tube to collect once again at the lower end of the heat tube.

Several aspects of the operation of the heat tube are of importance for the present invention. First, it should be noted that the heat tube produces a unidirectional flow of heat from a warmer lower end to a colder upper end. Secondly, the heat tube is somewhat sensitive to orientation, so that when the portable cooler of the present invention is inverted, placing the ice compartment below the medicine compartment, the flow of heat through the heat tube decreases substantially, thereby conserving the supply of ice or other coolant material. Finally, the use of a heat tube in the present invention is partcularly advantageous because the heat tube acts as a thermostat, transferring heat only when the temperature at the lower end of the heat tube exceeds the boiling point of the enclosed substance. In the normal situation, it is not necessary that the medicine be chilled to 32° F., but only to 40° F. In the present invention, this is accomplished by the use of a heat tube in which the enclosed substance has a boiling point of 40° F. This feature also helps to conserve the ice or other cooling material. Thus, it is seen that the use of a heat tube is highly advantageous in the portable cooler of the present invention because it conserves the cooling substance, thereby permitting longer periods of operation without adversely affecting the size and weight of the cooler.

In the preferred embodiment shown in FIG. 2, the ice compartment 34 is provided with an ice container 52 which includes a lid 54. In a preferred embodiment, the ice container 52 and the lid 54 are formed of plastic and the lid is of the "snap-on" type. In a preferred embodiment, maximum conductivity between the ice or other cooling substance within the ice container 52 and the heat sink 44 is achieved by positioning the heat sink 44 within the ice container 52 in direct contact with the ice bath or other cooling substance.

In a preferred embodiment, water ice is used as the cooling substance, mainly because of its wide availability and because of the relatively high specific heat of the water which is produced as the ice melts. However, in other embodiments, cold liquid water could be used, or a bath of alcohol or acetone cooled by water ice or dry ice. In another embodiment, a sealed plastic bag containing a frozen material can be placed within the ice compartment to provide the cooling required. The sealed plastic bag may be affixed to the interior of the ice compartment 34, in which case the cooler is prepared for use by placing it in a home freezer for a period of time prior to the contemplated trip.

If it were necessary to maintain a substance placed in the medicine compartment at an elevated temperature, the ice compartment could be filled with hot water and the device used in an inverted position. The temperature-regulating action of the heat tube would not obtain in this instance.

FIG. 3 shows a simplified alternative embodiment of the present invention in which the ice container 52 is omitted from the ice compartment 34. The ice or plastic bag filled with chilled gel is inserted into the ice compartment 34. A thin skin of plastic material is provided on the surfaces of the body 32 and the lids 38, 40, and particularly on the threads 56, 68 to provide greater durability. Because the threads 56 are at the top portion of the ice compartment 34, there is little likelihood that water will leak through the threads 56 in normal usage.

Thus, there has been described in detail a preferred embodiment of a portable cooler for medicine as well as several alternative embodiments. Other refinements and variation on the invetnion would be obvious to workers skilled in the art, and such refinements and variations are deemed to be within the scope of the invention.

What is claimed is:

1. A portable cooler for storing medicine and the like at a desired storage temperature less than room temperature but greater than 0° C., comprising in combination:

body means of insulative material enclosing an upper ice compartment and a lower medicine compartment, and having a wall of insulative material separating the ice compartment from the medicine compartment;

heat tube means disposed within said insulative wall, having a first end extending into the ice compartment and having a second end extending into the medicine compartment, said heat tube being operative to unidirectionally transfer heat from said lower compartment to said upper compartment, when and only when the temperature in said medicine compartment has increased to or above said desired storage temperature;

said heat tube means comprising a sealed hollow tube containing a liquid normally resting at the bottom of the tube and in thermal contact with said medicine compartment, said liquid being selected to boil when the temperature of the medicine compartment exceeds a predetermined temperature so that heat is carried by the resulting vapor into the upper end of said tube extending into said ice compartment wherein said vapor is cooled and condensed and thus returns to the bottom of said tube.

2. The portable cooler of claim 1 further comprising carrier means attached to said body for suspending said body with said ice compartment overlying said medicine compartment.

3. The portable cooler of claim 1 or claim 2 further comprising a top lid for access to said ice compartment and a bottom lid for access to said medicine compartment, and means for securing said top and bottom lids independently of one another.

4. The portable cooler of claim 1 or claim 2 wherein said body means is a body of insulative foam material covered with a thin skin of plastic material.

5. A portable cooler comprising:

housing means defining an insulated upper ice compartment and an insulated lower medicine compartment, said upper and lower compartments being separated by an insulated wall;

a heat tube passing through said insulating wall and having a first end extending into said insulated upper ice compartment and a second end extending into said insulated medicine compartment, said heat tube being operative to unidirectionally transfer heat from said lower compartment to said upper compartment;

a top lid for access to said ice compartment and a bottom lid for access to said medicine compartment;

carrying case means enclosing said housing and having top flap means and bottom flap means, and means for securing said top and bottom flap means independently of one another.

6. The portable cooler of claim 5 further comprisign a carrying strap attached to said carrying case such that said ice compartment overlies said medicine compartment.

7. The portable cooler of claim 5 or claim 6 wherein said housing means is a body of insulative foam material covered with a thin skin of plastic material.

* * * * *